Aug. 12, 1969     G. J. BRITTINGHAM     3,460,817
FURNACE FOR CONTINUOUS TREATMENT OF SULPHIDE COPPER ORES
Filed Sept. 21, 1964
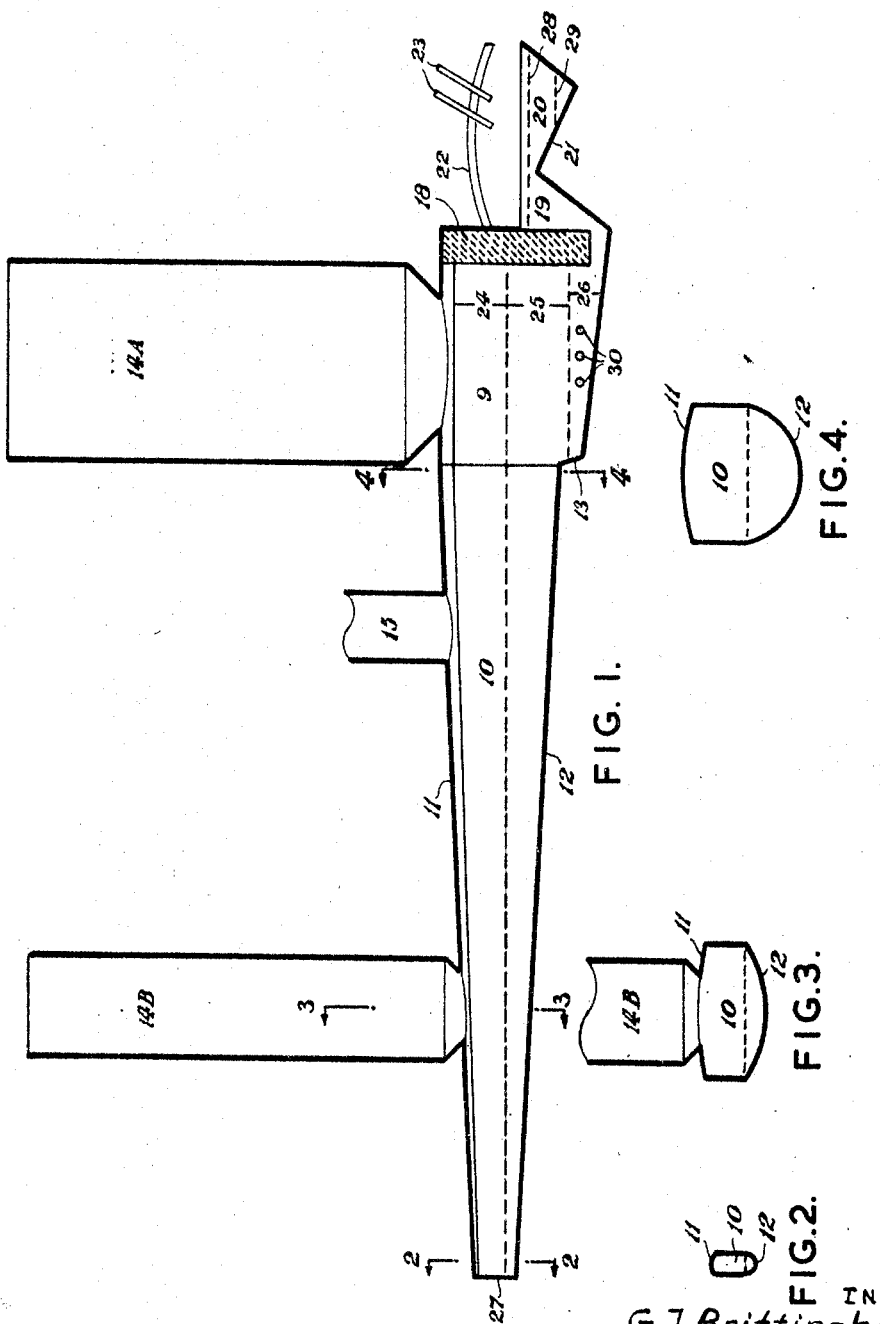
INVENTOR
G. J. Brittingham
BY
Richards & Geier
ATTORNEYS United States Patent Office
3,460,817
Patented Aug. 12, 1969

3,460,817
FURNACE FOR CONTINUOUS TREATMENT
OF SULPHIDE COPPER ORES
Geoffrey Joynt Brittingham, 34 Cambridge Road,
Surfers Paradise, Queensland, Australia
Filed Sept. 21, 1964, Ser. No. 397,931
Claims priority, application Australia, Sept. 30, 1963,
35,892/63
Int. Cl. C22b 15/00
U.S. Cl. 266—11                           10 Claims

ABSTRACT OF THE DISCLOSURE

A furnace for continuous treatment of copper sulphide ores includes a smelting hearth producing white-metal and slag layers, a section in which portion of the slag layer is isolated from underlying white-metal layer, means for reducing the isolated slag layer to separate matte therefrom, and means to return said matte to the white-metal layer.

This invention relates to the smelting and conversion of copper from sulphide ores.

The invention is particularly, though not exclusively, suited for use with the autogenous flash-smelting process for copper sulphide concentrates developed by Bryk and Ryselin in Finland, and in practical use at Harjavalta, Finland. ("Canadian Mining Journal," May 1958, page 79.)

In brief, the Harjavalta smelter feeds dried copper sulphide concentrates, with appropriate fluxes present, into a vertical shaft furnace together with pre-heated air. Reactions occur during the time the materials travel down the furnace shaft, and the products are collected in a smelting hearth below the shaft, where they separate into two immiscible liquids, slag and matte. The matte, being heavier, lies under the slag and may be separated by tapping at a lower level, while the slag is removed by tapping at a higher level.

The matte produced may be varied in grade by controlling the ratio of concentrate to air and the temperature of the air at entry, having regard also to the composition of the concentrates, particularly with relation to iron and sulphur contents. Matte grades as high as "white metal" (a matte containing substantially no iron, but only copper and sulphur) may be obtained.

For further treatment by oxidation of the matte to convert it to blister copper, it is transferred to a separate converter. The heat loss associated with transference of the matte by means of a ladle and then to a converter vessel, both of which are usually below the desired reaction temperature, means that fuel must be provided in the form of iron in the matte to permit the reactions to proceed. For this reason, the matte composition at Harjavalta has been about 60–50% copper.

An object of this invention is to provide for the production and subsequent oxidation of white metal without transference to a separate furnace.

The invention therefore envisages a process including the steps of smelting copper sulphide ores in a furnace to form white-metal and slag layers; isolating a portion of said white-metal from slag; and oxidizing said isolated white-metal.

The means for carrying out the oxidizing step may comprise oxidizing means for treating the matte with air, as by lances above or submerged tuyeres in the matte, means for forcing an air blast through said oxidizing means, means for controlling said air blast, and means for bottom-tapping white metal or copper. This arrangement as will be shown below may be set up in a single furnace.

Copper smelting and converting processes produce slags as a means of removing the iron content of the original feed. The slags are based primarily on the production of ferrous silicate ($2FeO \cdot SiO_2$), the equivalent of the natural mineral "fayalite."

This invention is based on my discovery of the following relation between various systems of slag and matte;

(A) Copper metal will form a conjugate solution with "white-metal" (i.e. virtually iron-free matte).

This is a two-liquid system in equilibrium with a gaseous phase. In the presence of iron, however, a third liquid phase (the slag) will form, and for equilibrium the oxidizing power of the slag (herein called the "oxygen potential") must be high. The "oxygen potential" is determined by the amounts of iron in various states of oxidation in the slag, primarily the ratio of $Fe_{++}$ to $Fe_{+++}$ therein.

(B) The amount of copper dissolved in a slag is directly dependant on its "oxygen potential." In the case of a copper solution in "white-metal" in contact with slag, the slag for equilibrium must have a high "oxygen potential" corresponding to 4–5% dissolved copper, or 24–28% ferric oxide in the slag.

(C) As the matte grade decreases (i.e. its copper content is lowered), the equilibrium "oxygen potential" of the slag also decreases, and therefore the amount of copper in the slag is also decreased.

Thus pure "white-metal" (no dissolved copper) is in equilibrium with slag having 2½–3% copper.

(D) As the matte grade decreases still further, the increased iron in its allows it to dissolve increased amounts of ferric oxide without any reaction occuring. The overlying slag can also dissolve ferric oxide and will take up increased amounts, thus artificially increasing its "oxygen potential" somewhat above the normal equilibrium value.

Thus with a slag layer overlying a matte layer, the copper content of the slag depends on the grade of the matte. In particular, slag overlying "white-metal" is essentially of high copper content, and while the slag remains in contact with the matte this copper content cannot be reduced to low values.

Previous copper smelting and converting practice recognised only that the basic operation is one of oxidation, and the process was conducted under strong oxidation conditions, greater than that corresponding to equilibrium between the given matte grade and the slag.

This raised the "oxygen potential" of the slag unduly (see (D) above) with resulting high copper content of the slag. Thus in existing practice the natural desire to increase the matte grade necessarily results in a slag with high copper content.

If, however, a smelting and converting system can produce a final slag at or close to equilibrium with a low grade matte and steps are taken to keep the "oxygen potential" of the slag to a minimum, it is clear from the above that the copper in the slag will be reduced to a minimum. This minium is of the order of 0.05% to 0.1% as compared to normal commercial percentages of 0.5% to 1%. Achievement of these minimum percentages yields a slag which can economically be discarded.

To obtain these low percentages of copper in the slag it is clearly necessary to isolate the slag layer from the underlying "white-metal" layer.

In order that the invention may be better understood, a specific embodiment will be described with reference to the accompanying drawings, in which:

FIGURE 1 shows diagrammatically a sectional elevation of a furnace, and

FIGURES 2, 3 and 4 show cross-sections of the furnace on lines 2—2, 3—3 and 4—4 respectively.

The furnace hearth includes a smelting hearth 9 and an elongated reducing hearth 10 extending from it. The hearth 10 is of inverted-arch type, tapering towards the left in FIGURE 1 (as shown by FIGURES 2, 3 and 4) and having an arched roof 11. The floor 12 of hearth 10 slopes downwards as shown in FIGURE 1, to meet the floor of smelting hearth 9 via a step 13.

Alternatively, floor 12 may extend smoothly into the smelting hearth 9 without the step 13.

A main autogenous flash smelting shaft 14A, of the known Harjavalta type discussed above, feeds the smelter hearth 9, and a smaller shaft 14B of the same type leads into the furnace above hearth 10; a common flue 15 lies between shafts 14A and 14B.

A separating refractory wall 18 extends downwards to well below slag level in hearth 9 to isolate white-metal in a receptacle 19 from slag. The wall 18 acts similarly to an Arutz syphon. An extension 20 of the receptacle 19 has a floor 21 sloping away from receptacle 19.

A refractory roof 22 extends over receptacle 19 and extension 20, and lances 23 pass through this roof above extension 20.

In operation, dried copper sulphide concentrates together with appropriate fluxes are fed into shaft 14A together with preheated air and are melted in falling into the combustion space 24 of hearth 9. The molten products separate into an upper slag layer 25 and a lower white-metal layer 26. This approaches the normal operation of a Harjavalta-type shaft. The white-metal layer 26 does not reach the floor of reducing hearth 10.

The slag is tapped at the extreme end 27 of hearth 10, and therefore flows to the left in FIGURE 1 beneath flue 15 and shaft 14B.

Shaft 14B operates similarly to shaft 14A, except that air supply is limited and the products reaching the slag are only partly oxidized. A strong reducing action occurs, the oxygen potential of the slag drops, and matte is deposited and flows back along the floor 12 to join the main bulk of the white-metal in layer 26. Between shaft 14B and the slag tapping point at 27 the slag cools somewhat (though remaining liquid) and more matte tends to be deposited.

In proper conditions, the tapped slag may hold so little copper that it may be discarded.

By placing the uptake flue 15 between shafts 14A and 14B any material from the gases of shaft 14B will pass back over and aid in the reduction of the slag. The impingement of the two gas streams from shafts 14A and 14B moving in opposite directions will cause good precipitation of the solid or molten materials contained in them. White-metal free of slag fills receptacle 19 to a level 28, and overflows into extension 20.

Air is blown through the lances 23 from an appropriate source (not shown), and oxidizes the white-metal in extension 20. When sulphur content drops sufficiently a copper phase separates, and this flows down the inclined floor 21 of extension 20 to form a copper layer 29 below the matte, which may be bottom-tapped. White-metal may obviously be separately tapped, if desired.

Instead of the lances 23, tuyeres (not shown) below the matte level 28 in extension 20, may be provided.

The shaft 14A is operated to produce a matte of white-metal grade. However, if conditions are such that this grade cannot be conveniently achieved, tuyeres 30 may introduce air to the matte layer 26 to provide white-metal in receptacle 19.

Having regard to the principles discussed above regarding equilibrium conditions between matte and slag layers, the operation of the furnace is as follows:

Ores are smelted in shaft 14A and hearth 9 to a white-metal layer 26 and an upper slag layer 25 of high copper content. Slag layer 26 flows to the left into hearth 10 and is isolated from the white-metal layer 26. Reducing action between flue 15 and shaft 14B decreases the "oxygen potential" (and therefore the copper content) of the slag, with deposition of matte therefrom. This matte flows to the right along floor 12 to join the white-metal layer 26. As the matte passes counter-current beneath slag layer 25 of increasing "oxygen potential," it is upgraded before reaching the white-metal. Between shaft 14B and slag tapping point 27, the slag is undisturbed and cools somewhat, so that further deposition of matte occurs.

The furnace described allows smelting, conversion and slag-cleaning to be done in one overall operation on a continuous basis. The total size of an installation can therefore be considerably reduced.

What I claim is:

1. A furnace for the continuous treatment of sulphide copper ores including:
   means for smelting said ores to form white-metal and slag layers;
   means for isolating a portion of said white-metal layer from said overlying slag layer;
   means for oxidizing said isolated white-metal;
   means for isolating portion of the slag layer from the underlying white-metal layer;
   means for reducing said isolated slag to separate matte therefrom; and
   means for returning said separated matte to said white-metal layer.

2. A furnace as claimed in claim 1, including means for tapping said isolated slag layer after reduction.

3. A furnace as claimed in claim 1, wherein a common flue for said first and second shafts lies between said shafts.

4. A furnace as claimed in claim 1, wherein said second shaft is spaced along said reducing hearth from said slag tapping point.

5. A furnace for the continuous treatment of sulphide copper ores including:
   a smelting hearth;
   a first autogenous flash smelting shaft above said smelting hearth and producing white-metal and slag therein;
   an elongated reducing hearth extending from said smelting hearth above the level of white-metal therein and having a floor sloping towards said smelting hearth;
   a second autogenous flash smelting shaft above said reducing hearth;
   a slag tapping point at that end of said reducing hearth remote from said smelting hearth;
   a white-metal receptacle extending from said smelting hearth on the side remote from said reducing hearth; and a refractory wall extending down below slag level between said smelting and said receptacle.

6. A furnace as claimed in claim 5, including an extenison of said receptacle, the floor of said extension sloping away from said receptacle.

7. A furnace as claimed in claim 6, including air lances above said extension.

8. A furnace as claimed in claim 6, including tuyeres in said extension.

9. A furnace as claimed in claim 5, including tuyeres below the slag level in said smelting hearth.

10. A furnace for the continuous treatment of sulphide copper ores including:
   a smelting hearth;
   a first autogenous flash smelting shaft above said smelting hearth and producing white-metal and slag layers therein;
   an elongated reducing hearth extending from said smelting hearth above the level of white-metal layer therein and having a floor sloping towards said smelting hearth;
   a second autogenous flash smelting shaft above said reducing hearth producing a product to reduce the slag layer beneath it; and a slag tapping point at that end of said reducing hearth remote from said smelting hearth.

References Cited

UNITED STATES PATENTS

| | | | |
|---|---|---|---|
| 1,682,343 | 8/1928 | Lanigan | 266—11 X |
| 1,799,643 | 4/1931 | Rogers | 266—11 X |
| 1,940,977 | 12/1933 | Simpson | 75—74 |
| 2,194,454 | 3/1940 | Greenawalt | 75—74 |
| 2,438,911 | 4/1948 | Gronningsaeter | 266—11 X |
| 3,148,974 | 9/1964 | Rampacek | 75—72 |
| 3,212,883 | 10/1965 | Cech et al. | 75—72 |
| 2,261,895 | 11/1941 | Zippler | 266—11 |
| 3,171,877 | 3/1965 | Thring | 266—11 |

J. SPENCER OVERHOLSER, Primary Examiner

ROBERT D. BALDWIN, Assistant Examiner

U.S. Cl. X.R.

75—72